May 2, 1939.     G. J. KESSENICH     2,156,294
SHOCK ABSORBING DEVICE
Filed May 10, 1938
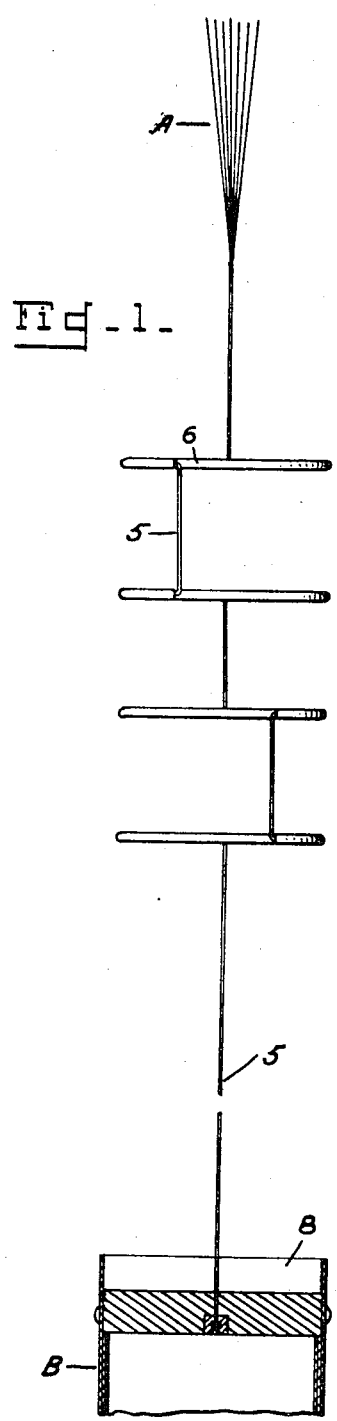
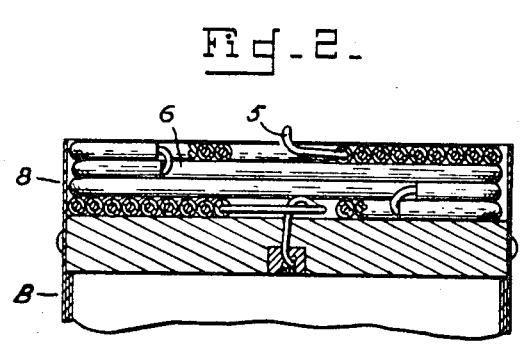
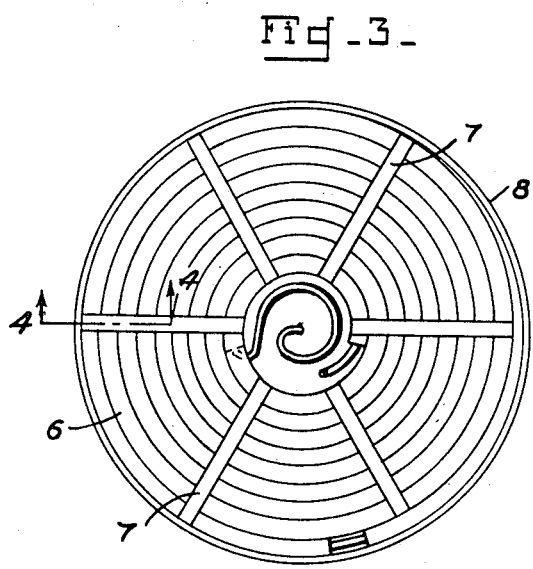
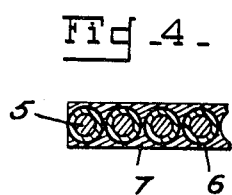
Inventor
Gregory J Kessenich

UNITED STATES PATENT OFFICE 2,156,294

SHOCK ABSORBING DEVICE

Gregory J. Kessenich, Madison, Wis.

Application May 10, 1938, Serial No. 207,107

5 Claims. (Cl. 102—24)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a shock absorbing device and more particularly it has reference to that class of shock absorbers which are particularly adapted to parachute suspensions though not limited thereto.

When a parachute and a body to be suspended thereby are traveling at high speed at the time the parachute is opened, the shock occasioned by the sudden retardation is frequently sufficient to cause the shrouds or the fabric of the parachute to give way or to cause injury to the suspended body.

The purpose of this invention is to associate a shock absorbing element with the suspension cable and to so form and arrange the element that it will resist straightening of the cable and thereby provide a gradual retardation of the suspended body when the parachute is opened.

A further object is to so form the shock absorbing element that it may be conveniently packed in a container without loss of space.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of the shock absorbing device prior to opening of the parachute;

Fig. 2 is a sectional view with the intermediate spirals in elevation showing the shock absorbing device packed in a container;

Fig. 3 is a plan view of Fig. 2;

Fig. 4 is an enlarged sectional view generally on the line 4—4 of Fig. 3.

Referring to the drawing by characters of reference there are shown the shrouds A of a parachute and a body B connected to the shrouds by a flexible suspension cable 5. Several portions of the cable each pass through a tube 6 of bendable material, such as copper, which is coiled into a flat spiral. The coils of each spiral are held in place and releasably connected by a material 7 such as solder or a plastic or an adhesive which will offer a desirable resistance to a force tending to uncoil the tubes. This material may be disposed in the form of radial bands.

The spirals are normally carried in a container 8 which may be associated with either the body or the shrouds or which may be independent of these members. They are packed into the container one above another and parallel thereto.

When the parachute and the body to be suspended thereby are released in space their separation causes the spirals to be withdrawn from the container as shown in Fig. 1. The parachute on opening is retarded and the energy of the falling body is gradually absorbed by the straightening out of the tube of each spiral due to the pull of the cable. The tube in addition to uncoiling must break away from the bands 7. All of the spirals and both ends of each spiral are free to act simultaneously in absorbing shock.

I claim:

1. A shock absorbing device comprising a flexible cable, a plurality of tubes of bendable material surrounding different portions of the cable, each tube coiled into a plane spiral, radially disposed bands extending across the coils of each spiral, said bands being of a material to yieldingly resist uncoiling of the spirals when tension is applied to the cable.

2. A shock absorbing device comprising a flexible cable, a plurality of tubes of bendable material surrounding different portions of the cable, each tube coiled into a plane spiral, and means connecting the coils of each spiral and yieldingly resisting uncoiling thereof when tension is applied to the cable.

3. A shock absorbing device comprising a flexible cable, a plurality of tubes of bendable material surrounding different portions of the cable, each tube coiled into a plane spiral to yieldingly resist straightening out when tension is applied to the cable and adapted to remain straightened out.

4. A shock absorbing device comprising a flexible cable, a tube of bendable material surrounding a portion of the cable, and coiled into a plane spiral and means connecting the coils of the spiral and yieldingly resisting uncoiling thereof when tension is applied to the cable.

5. A shock absorbing device comprising a flexible cable, a tube of bendable material surrounding a portion of the cable and coiled into a plane spiral to yieldingly resist straightening out when tension is applied to the cable and adapted to remain straightened out.

GREGORY J. KESSENICH.